United States Patent
Cheng et al.

(10) Patent No.: US 7,400,237 B2
(45) Date of Patent: Jul. 15, 2008

(54) SIGNALING SYSTEM FOR USE IN A VEHICLE TO PROVIDE A SIGNAL INDICATIVE OF A CHANGE IN A VEHICLE SPEED

(76) Inventors: Christl Cheng, 405-35 Charles Street West, Toronto, Ontario (CA) M4Y 1R6; Xun Bill Cheng, 405-35 Charles Street West, Toronto, Ontario (CA) M4Y 1R6

(\*) Notice: Subject to any disclaimer, the term of this patent is extended or adjusted under 35 U.S.C. 154(b) by 122 days.

(21) Appl. No.: 11/407,188

(22) Filed: Apr. 20, 2006

(65) Prior Publication Data

US 2006/0250229 A1  Nov. 9, 2006

(30) Foreign Application Priority Data

May 3, 2005   (CA) .................................. 2506268

(51) Int. Cl.
*B60Q 1/50* (2006.01)
(52) U.S. Cl. .................. 340/467; 340/464; 340/479
(58) Field of Classification Search ............. 340/463, 340/464, 467, 479, 429
See application file for complete search history.

(56) References Cited

U.S. PATENT DOCUMENTS

| | | | | |
|---|---|---|---|---|
| 2,474,610 A * | 6/1949 | Wunsch | ...................... | 340/467 |
| 3,423,746 A * | 1/1969 | Guin | .......................... | 340/467 |
| 3,501,742 A * | 3/1970 | Ellison | ....................... | 340/467 |
| 3,559,164 A * | 1/1971 | Bancroft et al. | ............. | 340/467 |
| 3,846,748 A * | 11/1974 | Hopwood | ................... | 340/467 |
| 4,983,952 A * | 1/1991 | Athalye | ...................... | 340/467 |
| 5,712,617 A * | 1/1998 | Quan | .......................... | 340/467 |
| 2005/0067520 A1* | 3/2005 | Webber et al. | ........... | 242/384.4 |

\* cited by examiner

*Primary Examiner*—Brent Swarthout (57) ABSTRACT

The present invention relates to an advanced warning system operable to provide a more precise indicator to the operator of a following vehicle as to the changes in vehicle speed of the leading vehicle. The present invention utilizes an indicator signal and/or an acceleration signal. The indicator signal produces a slowing signal that indicates to the operator of the following vehicle that the leading vehicle is slowing down prior to the operator of the leading vehicle actually depressing the brake pedal. The acceleration signal provides a speeding up signal to the operator of the following vehicle.

17 Claims, 5 Drawing Sheets

SIGNALING SYSTEM FOR USE IN A VEHICLE TO PROVIDE A SIGNAL INDICATIVE OF A CHANGE IN A VEHICLE SPEED

FIELD OF THE INVENTION

The present invention relates to a vehicle warning system for a vehicle which provides a signal indicative of a change in vehicle speed. In particular, the present invention is directed to a signaling system which provides a slowing down and/or speeding up signal to alert following and oncoming vehicles of the braking or acceleration of the leading vehicle or the vehicle in front.

BACKGROUND OF THE INVENTION

Many motor vehicle accidents are from rear end collisions which could have been avoided if the driver of the following vehicle received an advanced warning as to the sudden slowing, stopping or acceleration of the vehicle in front. All modern vehicles are equipped with brake lights and blinking turning signals, both of which are intended to inform the drivers of vehicles following behind and/or the drivers of oncoming vehicles that the vehicle in front is either stopping or turning. Unfortunately, such limited information does not fully inform the following or oncoming drivers as to the status of the vehicle in front. For example, the brake light merely indicates to the operator of the following vehicle that the driver of the leading vehicle has depressed the brake pedal. No further information beyond sudden hard braking is provided as to the rate of decrease in speed of the leading vehicle. The result is that the driver of the following vehicle must utilize other external cues to assess the speed of the leading vehicle. Such external cues may include whether the cars in front of the leading vehicle have their brake lights on, and the rate of decrease in the gap between the leading vehicle and the following vehicle.

Accordingly, the leading vehicle's decreasing speed is difficult to judge by the operator of the following vehicle solely from the brake light. Furthermore, reliance and utilization of the external cues and the accuracy with which the driver of the following vehicles can interpret these cues is subject to external influencing factors such as weather conditions, the operator's driving experience, and other distractions in the surrounding environment.

Conventional vehicle warning systems are linked to the brake pedal and attempt to provide a warning light indicating a decrease in vehicle speed once the brake pedal is depressed. The disadvantage is that the time period between the time the user removes his or her foot from the acceleration pedal to the time the brake pedal is depressed is lost. As such, conventional systems do not provide an instantaneous indication of changes in vehicle speed but merely an indication that the operator of the leading vehicle is deploying the brake pedal. That is, conventional warning systems are only activated by a change in vehicle speed produced by deployment of the brake pedal and do not provide an advanced warning before braking. Conventional warning systems do not account for changes in vehicle speed that are produced other than by deployment of the brake pedal, as for example reduction in vehicle speed produced by removal of the user's foot from the acceleration pedal during coasting. Furthermore, conventional vehicle warning systems do not provide an indication of an increase in vehicle speed such as when the vehicle is accelerating, as for example driving against strong wind, up-hills, climbing, etc.

Conventional vehicle warning systems provide even more limited information to drivers of oncoming vehicles. The vehicle turning signal merely indicates that at some point the driver of the vehicle in front had an intention to turn but does not indicate if that intention is still present or if the driver of the vehicle in front has merely forgotten the turning light on. Accordingly, driver's of oncoming vehicles are often guessing at the intention of the approaching vehicle.

SUMMARY OF THE INVENTION

Accordingly, an advantage of the present invention is to enhance the safety features for vehicles and thereby decrease motor vehicle accidents occurring from both rear end and front end collisions.

It is also an advantage of the present invention to provide an enhanced signaling system for pre-warning following and oncoming vehicles as to changes in the speed of the leading vehicle prior to depression of the brake pedal, and in addition to the vehicle turning signals.

It is a further advantage of the present invention to provide an enhanced signaling system for pre-warning following and oncoming vehicles of a change in vehicle speed produced other than by depression of the brake pedal.

The present invention seeks to provide an enhanced signaling system which fully appraises the drivers of vehicles following behind and/or oncoming vehicles in front of the leading vehicle as to the status of the leading vehicle, namely as to whether it is accelerating, slowing down or stopping. The present invention advantageously provides detailed information as to the status of the leading vehicle by providing an enhanced signaling system which advantageously processes and relays signals to following and/or oncoming drivers in response to the driving operations (i.e. braking and/or acceleration) carried out by the driver of the leading vehicle which cause a change in vehicle speed.

It is also an advantage of the present invention to provide a vehicle signaling system operable to sense a change in speed of the vehicle and provide a signal indicative thereof substantially instantaneously with a speed change.

The signaling system of the present invention is directed at overcoming the disadvantages in conventional warning systems by providing the operator of a trailing vehicle with an advanced indication of a change in the leading vehicle's speed. Thus, the system of the present invention seeks to provide the driver of the trailing vehicle a longer time to react. In this regard, an advantage of the present system is that the signaling system in a preferred embodiment is independent from the brake and acceleration pedals so that it is the actual movement of the leading vehicle which provides an anticipatory signal to drivers of following vehicles as to a change in the leading vehicle's speed. Accordingly, an advantage of the signaling system of the present invention is that it can be an after market addition to the vehicle.

Accordingly, in one aspect, the signaling system of the present invention provides a signal indicative of a decrease in vehicle speed or "slowing down", when a minimum threshold decrease in vehicle speed causes the vehicle to pitch or sway forward. The system saves the time period between which the driver removes his or her foot from the acceleration pedal and places it onto the brake pedal activating the brake light. Thus, activation of the signaling system of the present invention provides additional time for the driver of the trailing vehicle to react to decreases in the vehicle speed of the leading vehicle, prior to deployment of the brake pedal.

In another aspect, the signaling system of the present invention provides a signal indicative of an increase in vehicle speed or "speeding up" when a minimum threshold increase in vehicle speed causes the vehicle to lurch or pitch backward.

The particular movement of the vehicle activates the signaling system of the present invention to produce a specific warning signal. The specific warning signal produced provides better and more accurate information as to the precise status of the leading vehicle, for example speeding-up or slowing down.

In another aspect, the present invention seeks to provide an after market device that can be installed in the vehicle and integrated with the vehicle light system.

In yet another aspect, the present invention seeks to provide an after market device that can be installed in or on the vehicle in a location selected to be visible to the driver of another vehicle, and operate independently of the vehicle light system.

In yet another aspect, the present invention resides in a signaling system for use in a vehicle to provide a signal indicative of a change in vehicle speed, the signaling system comprising a housing; a displaceable member moveable relative to the housing from a first rest position to each of a forward displaced position and a reward displaced position, wherein the displaceable member is displaced from the first rest position to one of the forward displaced position and the reward displaced position in response to movement of the vehicle caused by a threshold minimum change in vehicle speed; a guide member for resiliently biasing said displaceable member to said rest position; a forward switch assembly positioned relative to said housing so as to be transiently activated when said displaceable member is in the forward displaced position; a rearward switch assembly positioned relative to said housing so as to be transiently activated when said displaceable member is in the reward displaced position; an indicator signal positioned in a location selected to be visible to an operator of another vehicle, the indicator signal electrically coupled to the forward switch assembly, wherein activation of the forward switch assembly activates the indicator signal to provide a visual signal indicative of a vehicle slowing and an acceleration signal positioned in a location selected to be visible to the operator of another vehicle, the acceleration signal electrically coupled to the reward switch assembly, wherein activation of the reward switch assembly activates the acceleration signal to provide a visual speeding-up signal.

In another aspect, the present invention resides in a signaling system for use in a vehicle to provide a signal indicative of a change in vehicle speed, the signaling system comprising a housing; a displaceable member moveable relative to the housing from a first rest position to a forward displaced position in response to forward movement of the vehicle caused by a threshold minimum change in vehicle speed; a guide member for resiliently positioning said displaceable member to said rest position; a forward switch assembly positioned relative to said housing so as to be transiently activated when said displaceable member is in the forward displaced position and an indicator signal positioned in a location selected to be visible to an operator of another vehicle, the indicator signal electrically coupled to the forward switch assembly, wherein activation of the forward switch assembly activates the indicator signal to provide a visual signal indicative of a vehicle slowing.

In a further aspect, the present invention resides in a signaling device for use in a vehicle to provide a signal indicative of a change in vehicle speed, the device comprising a housing; a displaceable member moveable relative to the housing from a first rest position to each of a forward displaced position and a reward displaced position, wherein the displaceable member is displaced from the first rest position to one of the forward displaced position and the reward displaced position in response to movement of the vehicle caused by a threshold minimum change in vehicle speed; a guide member for resiliently positioning said displaceable member to said rest position; a forward switch assembly positioned relative to said housing so as to be transiently activated when said displaceable member is in the forward displaced position; a rearward switch assembly positioned relative to said housing so as to be transiently activated when said displaceable member is in the reward displaced position; an indicator signal positioned in a location selected to be visible to an operator of another vehicle, the indicator signal electrically coupled to the forward switch assembly, wherein activation of the forward switch assembly activates the indicator signal to provide a visual signal indicative of a vehicle slowing and an acceleration signal positioned in a location selected to be visible to the operator of another vehicle, the acceleration signal electrically coupled to the reward switch assembly, wherein activation of the reward switch assembly activates the acceleration signal to provide a visual speeding-up signal.

BRIEF DESCRIPTION OF THE DRAWINGS

Further aspects of the present invention will become apparent upon reading the following detailed description together with the accompanying drawings in which.

DETAILED DESCRIPTION OF THE PREFERRED EMBODIMENTS

Figure 1A:
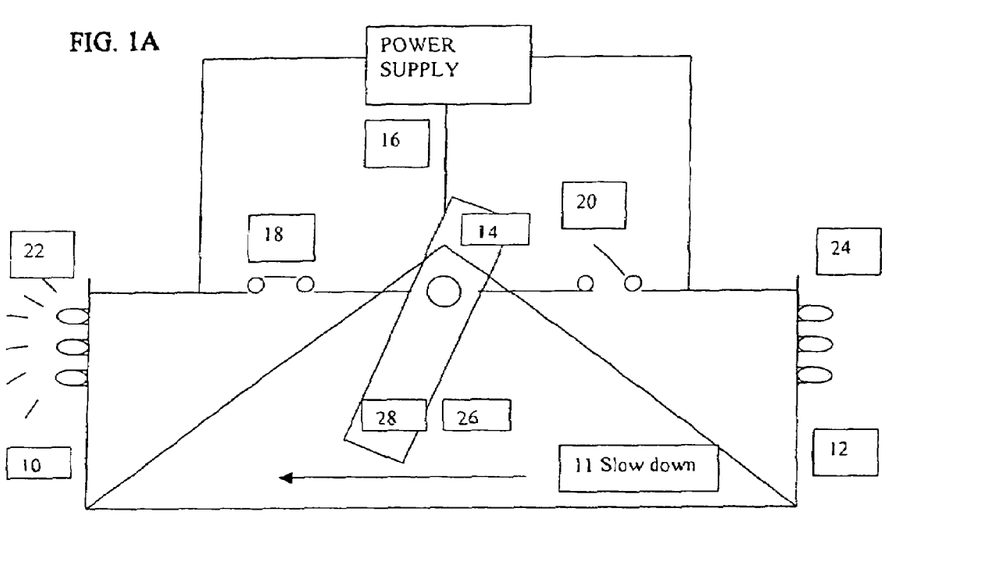
FIGS. 1A and 1B show diagrams of the signaling system in accordance with a preferred embodiment of the present invention.
Figure 1B:
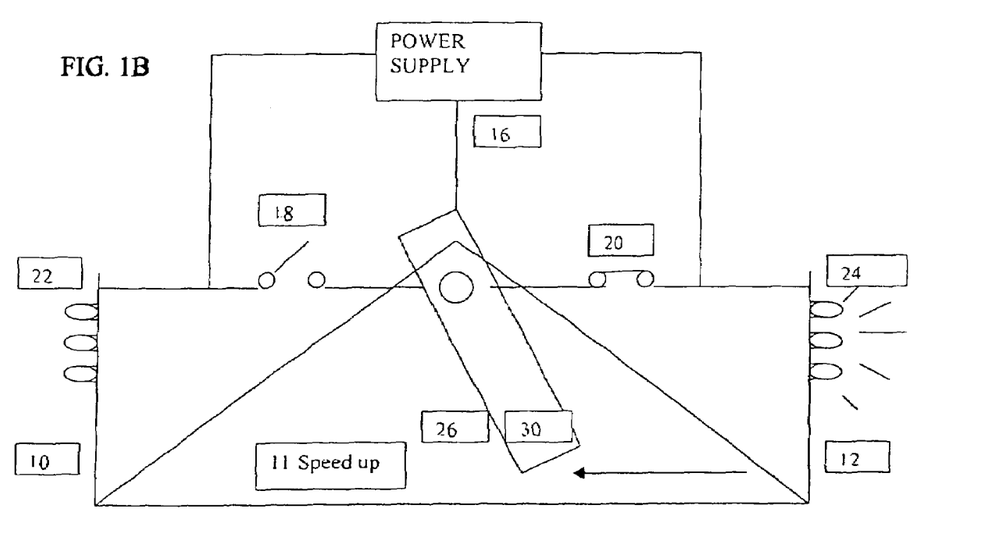

FIGS. 1A and 1B are diagrams of the signaling system 10 for use in vehicle 11 in accordance with a preferred embodiment of the present invention. In a preferred embodiment, the signaling system 10 is an after market addition to the vehicle 11. The signaling system includes a housing 12, a displaceable member 14, a guide member 16, a forward contact switch 18, a reward contact switch 20, indicator signal 22 and an acceleration signal 24. In an alternate preferred embodiment, the housing 12 would comprise a gimbal member (not shown).

The displaceable member 14, in a preferred embodiment, comprises a swing bar moveable relative to the housing 12 from a first rest position (or balanced position) 26 to each of a forward displaced position 28 (FIG. 1A) and a reward displaced position 30 (FIG. 1B) in response to movement of vehicle 11 caused by a threshold minimum change in vehicle speed. The threshold minimum decrease in vehicle speed causes the vehicle 11 to pitch or sway forward, displacing the displaceable member 14 from the balanced or rest position 26 to the forward displaced position 28 in contact with the forward contact switch 18. Contact between the displaceable member 14 when in the forward displaced position 28 and the forward contact switch 18, transiently activates the forward contact switch 18. Similarly, the threshold minimum increase in vehicle speed which causes the vehicle 11 to pitch or sway backward, displaces the displaceable member 14 to the reward displaced position 30 in contact with reward switch 20. Contact with the displaceable member 14 when in the reward displaced position 30 transiently activates the reward contact switch 20. Displaceable member 14 is returned or biased back to the rest position 26 by the guide member 16 once the speed of the vehicle 11 drops below the threshold minimum increase or decrease.

The forward contact switch 18 is electrically coupled to indicator signal 22 and the reward contact switch 20 is electrically coupled to acceleration signal 24. Both of the indicator signal 22 and the acceleration signal 24 are positioned in a location selected to be visible to an operator of another vehicle. Activation of the forward contact switch 18 activates the indicator signal 22 to provide a visual signal indicative of a vehicle slowing. Activation of the reward contact switch 20 activates the acceleration signal 24 to provide a visual speeding-up signal.

In a preferred embodiment, the indicator signal 22 and the acceleration signal 24 are LED lights that are placed on the housing 12, which is positioned in or on the vehicle 11 in a location selected to be visible to the operation of another vehicle. By way of non-limiting example the housing 12 could be placed in the rear end of vehicle 11 near a rear windshield, in view of the operator of a following vehicle, or as an attachment for placement on a vehicle hood as a hood mounted after market signaling device.

In another embodiment of the invention (not shown), the indicator signal 22 and the acceleration signal 24 of vehicle 11 are vehicle lamps which can be placed in a location on the vehicle 11 adjacent the brake lamp and/or head lamp.

In a further embodiment (not shown), the indicator signal 22 and acceleration 24 comprise individual filaments that are a part of the brake lamp in addition to a brake lamp filament.

In a further preferred embodiment, the signaling system would further comprise a signal controller (not shown) operable by both the forward contact switch 18 and reward contact switch 20. The signal controller would be operable to effect a signal feature of each of the indicator signal 22 and acceleration signal 24. The signal feature affected by the signal controller in a preferred embodiment would be selected from the group consisting of signal illumination, signal intensity, signal frequency and signal extinguishment.

Figure 2:
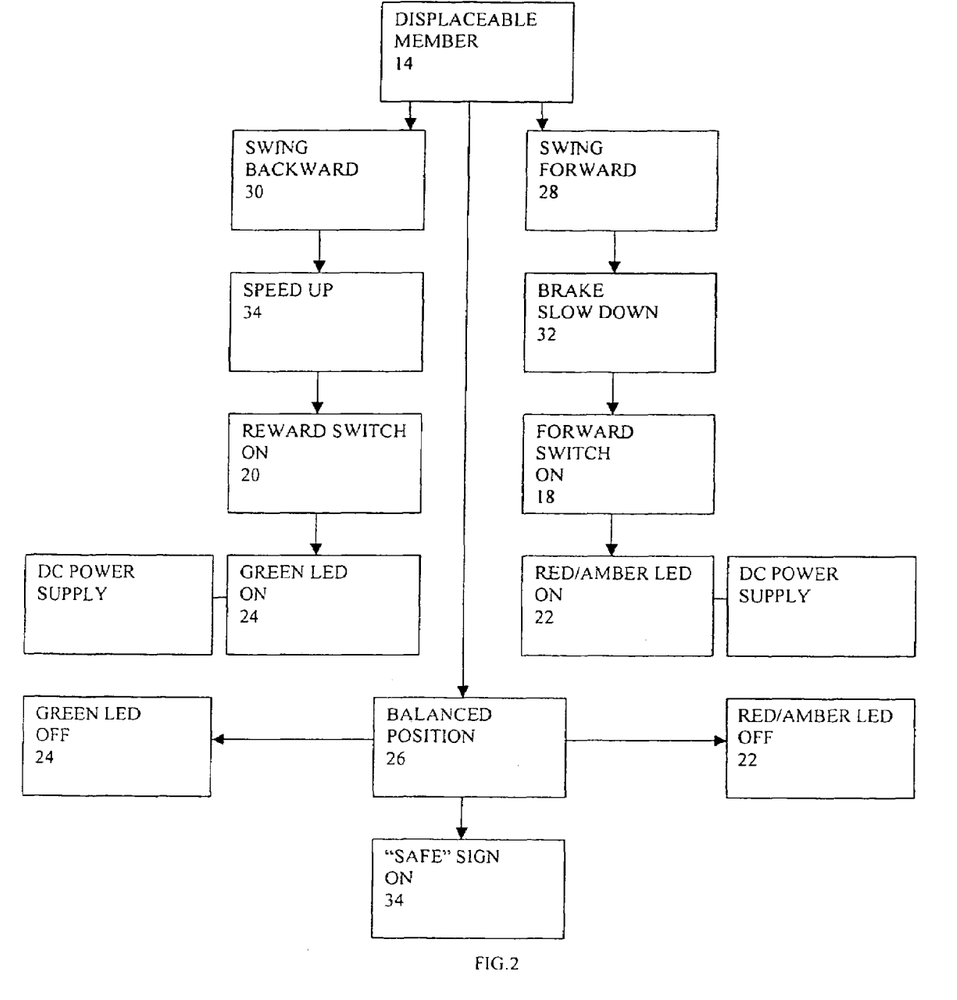
FIG. 2 is a flow chart diagram of the operation of the signaling system of FIG. 1.

Referring now to FIG. 2. A flow chart diagram of the operation of the signaling system 10 of FIGS. 1A and 1B is shown. When the displaceable member 14 swings to the forward displaced position 28 during breaking or slowing down 32, the forward contact switch 18 is activated and in turn activates the indicator signal 22 to, in a preferred embodiment produce a red or amber light. When the displaceable member 14 swings toward the reward displaced position 30, during the vehicle speeding up 34, the reward contact switch 20 is activated and in turn activates the acceleration signal 24 to, in a preferred embodiment produce a green light. When the displaceable member 14 is in the balanced or rest position 26 both the acceleration signal 24 and indicator signal 22 are "off". In one embodiment, displaceable member 14 in the balanced or rest position 26 is operable to produce a "safe signal" 34.

FIGS. 3A, 3B, 4A, 4B, 5A and 5B show alternate embodiments of the displaceable member 14 and guide member 16 of the signaling system 10 of FIGS. 1A and 1B wherein like reference numerals are used to identify like components.

Figure 3A:
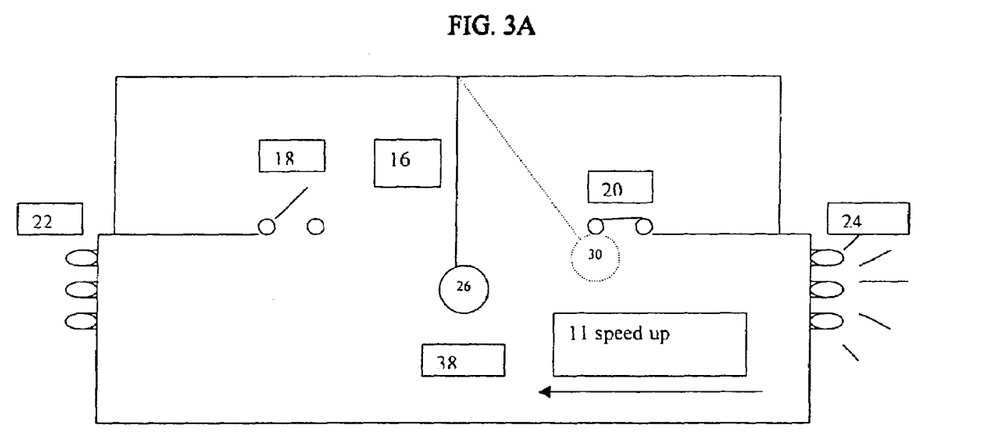
FIGS. 3A, 3B, 4A, 4B, 5A and to 5B are alternate embodiments of the displaceable member and guide member of the signaling system of FIGS. 1A and 1B.
Figure 3B:
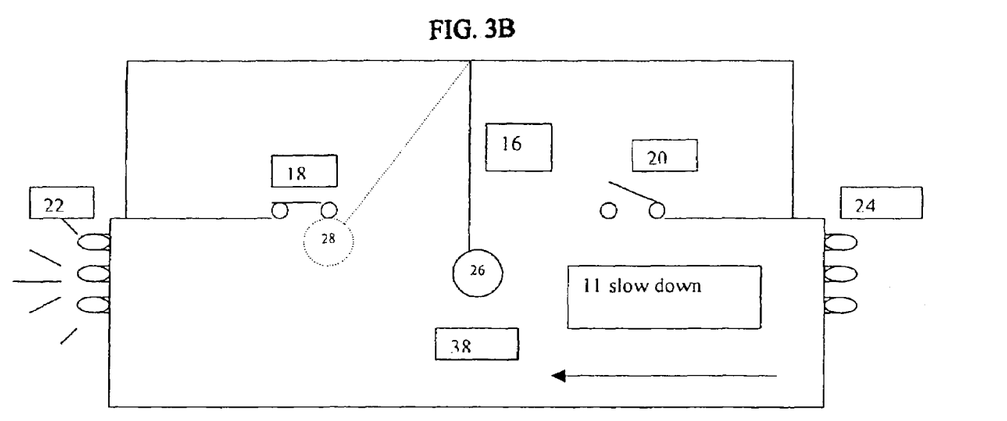

In FIGS. 3A and 3B, guide member 16 comprises a swing member selected from one of an inflexible arm and a flexible connector. The displaceable member 14 comprises a weighted member which is suspended from a lower end portion of the swinging member for pendulate movement thereby along a substantially concave arcuate path 36. The displaceable member 14 is displaced during the pendulate movement along the concave arcuate path 36 from the rest position 26 substantially juxtaposed with a midpoint 38 of the concave arcuate path 36 to one of a first position 28 (FIG. 3B) in contact with the forward contact switch 18 and a second position 30 (FIG. 3A) in contact with the reward contact switch 20.

Figure 4A:
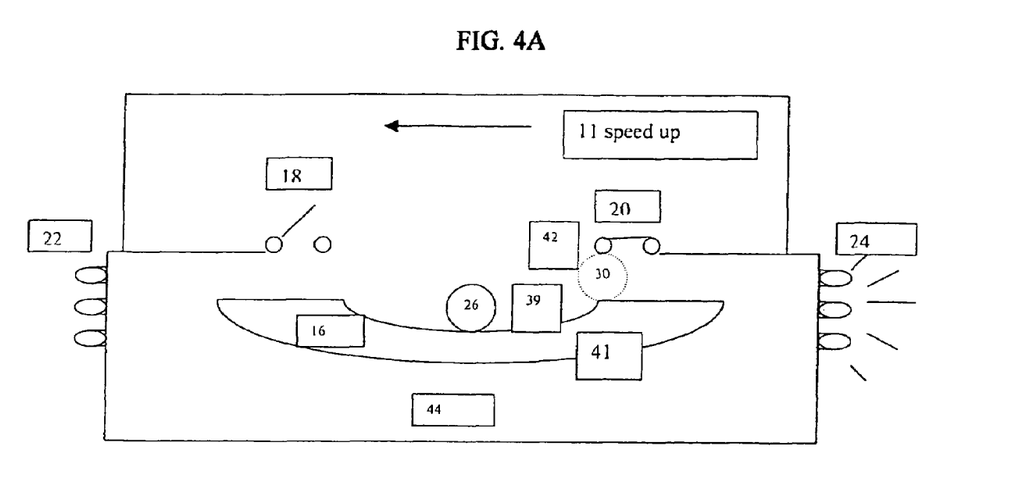
Figure 4B:
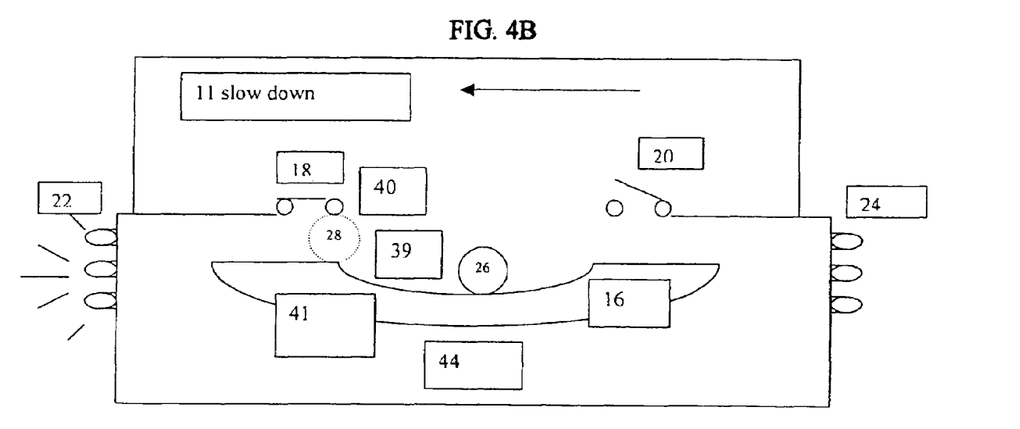

Referring now to FIGS. 4A and 4B, yet another embodiment of the displaceable member 14 and guide member 16 are illustrated. In FIG. 4, the guide member 16 comprises an elongated U-shaped member with a forward end 40 spaced toward a position adjacent the forward contact switch 18. The U-shaped member also comprises a reward end 42 spaced towards a position adjacent the reward contact switch 20. In a preferred embodiment, the guide member 16 also comprises legs 41 operable to connect the U-shaped member 39 to the housing 12. The displaceable member 14 is positioned on the U-shaped member 39 for movement relative thereto from the rest position 26 substantially juxtaposed with a bight (or centre) position 44 to one of a forward displaced position 28 (FIG. 4B) at the forward end 40 in contact with the forward contact switch 18 or the reward displaced position 30 (FIG. 4A) at the reward end 42 in contact with the reward contact switch 20.

Figure 5A:
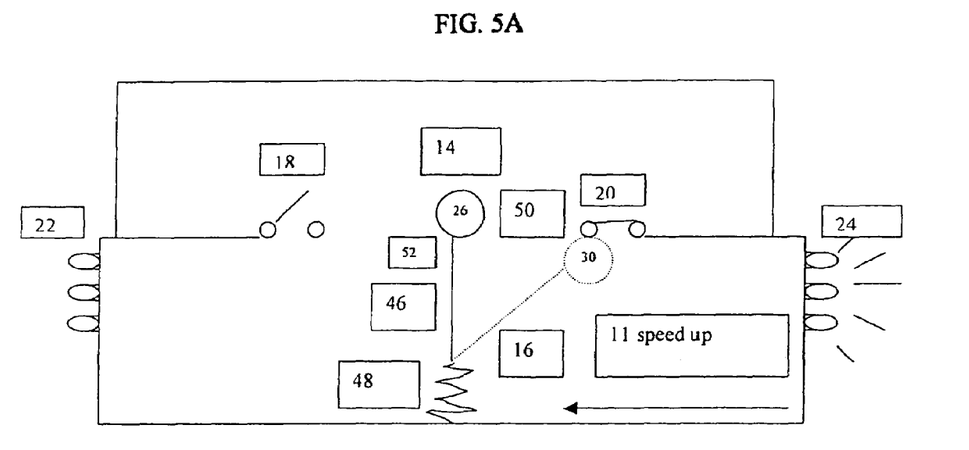
Figure 5B:
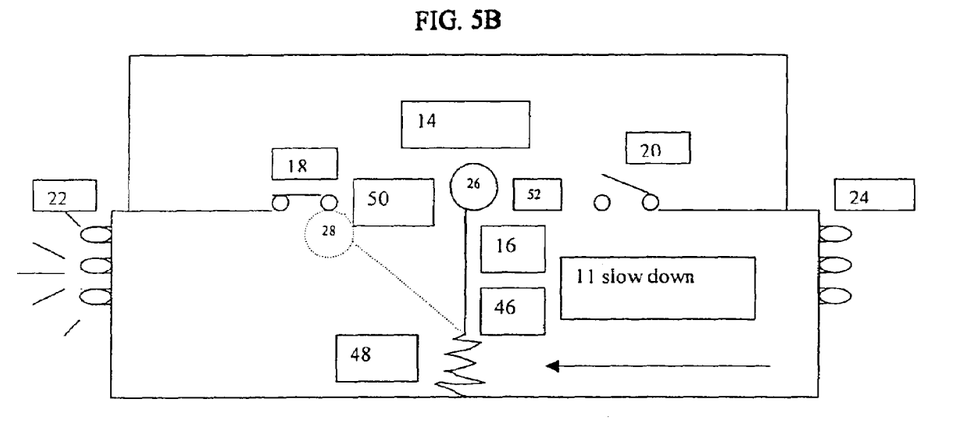

FIGS. 5A and 5B show further alternate embodiment of the displaceable member 14 and guide member 16 of the signaling system 10 of FIGS. 1A and 1B. In FIGS. 5A and 5B, guide member 16 comprises a vertically upright inflexible member 46 connected to a spring member 48. The displaceable member 14 is supported at an upper end portion of the vertically upright member 46 for vacillating movement thereby along a substantially convex arcuate path 50. The displaceable member 14 is displaced during vacillating movement along the convex arcuate path 50 from the rest position 26 substantially juxtaposed with a midpoint 52 of the convex arcuate path 50 to one of the forward displaced position 28 (FIG. 5B) in contact with the forward switch assembly 18 and the reward displaced position 30 (FIG. 5A) in contact with the reward contact switch 20.

It can be appreciated that although a preferred embodiment has been described, other operable embodiments are possible to achieve the advantages of the present invention.

Although the signaling system 10 of the present invention has been described in the preferred embodiment as having both indicator signal 22 and an acceleration signal 24, it is to be understood that this is but one embodiment of the invention. A skilled artisan would readily appreciate that the signaling system 10 need not include both the indicator signal 22 and acceleration signal 24 to achieve the advantages of the present invention. By way of non-limiting example, a skilled artisan would appreciate that in an alternate embodiment the displaceable member 14 would be displaced only to the forward displaced position 28 from the rest or balanced position 26. Also by way of non-limiting example, a skilled artisan would also appreciate that a guide member 16, which only allows for displacement to the forward displaced position 18 may achieve such an embodiment. A skilled artisan could also envision that the embodiment may also be achieved by signaling system 10, which comprises only a forward switch assembly.

Furthermore, a skilled artisan would readily appreciate the various electrical switches and wiring which would be operable within the present invention to achieve the advantages thereof.

Although in the preferred embodiment, each of the forward contact switch 18 and reward contact switch 20 have been described as being contact switches, a skilled artisan would appreciate other types of switches that would be operable to achieve the advantages of the present invention. Furthermore, although the activation of the forward contact switch 18 and the reward contact switch 20 has been described as occurring when contact is made with the displaceable member 14, a skilled artisan would appreciate that the forward contact switch 18 and reward contact switch 20 could be activated by contact with the guide member 16 when the displaceable member 14 is in the forward displaced position 28 and reward displaced position 30, respectively.

It would be understood that all the various features of the invention have been described with respect to one or another of the embodiments in the invention, and that the various features and embodiments of the invention may be combined or used in combination with other features and embodiments of the invention as described and illustrated herein.

Furthermore although this disclosure has been described and illustrated as containing preferred embodiments of the invention, it is to be understood that the invention is not restricted to these particular embodiments. Rather, the invention includes all embodiments, which are functional, electrical or mechanical equivalence of the specific embodiments and features that have been described herein.

We claim:

1. A signaling system for use in a vehicle to provide a signal indicative of a change in vehicle speed, the signaling system comprising:
    a housing;
    a displaceable member moveable relative to the housing from a first rest position to each of a forward displaced position and a rearward displaced position, wherein the displaceable member is displaced from the first rest position to one of the forward displaced position and the rearward displaced position in response to movement of the vehicle caused by a threshold minimum change in vehicle speed;
    a guide member for resiliently biasing said displaceable member to said rest position;
    a forward switch assembly positioned relative to said housing so as to be transiently activated when said displaceable member is in the forward displaced position;
    a rearward switch assembly positioned relative to said housing so as to be transiently activated when said displaceable member is in the rearward displaced position;
    an indicator signal positioned in a location selected to be visible to an operator of another vehicle, the indicator signal electrically coupled to the forward switch assembly, wherein activation of the forward switch assembly activates the indicator signal to provide a visual signal indicative of a vehicle slowing; and
    an acceleration signal positioned in a location selected to be visible to the operator of another vehicle, the acceleration signal electrically coupled to the rearward switch assembly, wherein activation of the rearward switch assembly activates the acceleration signal to provide a visual speeding-up signal, and wherein each of the indicator signal and acceleration signal is adapted for positioning on the vehicle in a location selected to be visible to the operator of another vehicle, said location selected from at least one of:
    (a) a position in at least one of a rear windshield of the vehicle and a front windshield of the vehicle; and
    (b) a position adjacent at least one of a headlamp and a brake lamp,
    a signal controller actuable by both the forward switch assembly and the rearward switch assembly, the signal controller operable to effect a signal feature of each of the indicator signal and the acceleration signal selected from the group consisting of signal illumination, signal intensity, signal frequency and signal extinguishment, wherein upon activation by one of the forward switch assembly or the rearward switch assembly, the signal controller is operable to effect a change in the signal intensity of the respective one of the indicator signal and the acceleration signal to produce either a slowing signal or a speeding up signal with a predetermined brightness, and
    wherein the brake lamp comprises a first filament operable as a braking signal and a second filament operable as the indicator signal, wherein activation of the indicator signal by the signal controller effects the change in the signal intensity of the indicator signal to produce the slowing signal with a predetermined brightness less than a brightness of the braking signal.

2. The signaling system according to claim 1, wherein the guide member comprises an elongated U-shaped member with a forward end spaced toward a position adjacent the forward switch assembly and a rearward end spaced toward a position adjacent the rearward switch assembly, wherein the displaceable member is positioned on the U-shaped member for movement relative thereto from the rest position substantially juxtaposed with a bight position of the U-shaped member to one of the forward end in contact with the forward switch assembly or the rearward end in contact with the rearward switch assembly.

3. The signaling system according to claim 1, wherein the guide member comprises a swinging member selected from one of an inflexible arm and a flexible connector, wherein the displaceable member is suspended from a lower end portion of the swinging member for pendulate movement thereby along a substantially concave arcuate path from the rest position substantially juxtaposed with a midpoint of the concave arcuate path to one of a first position in contact with the forward switch assembly and a second position in contact with the rearward switch assembly.

4. The signaling system according to claim 1, wherein the guide member comprises a vertically upright inflexible member connected to a spring member, wherein the displaceable member is supported at an upper end portion of the vertically upright member for vacillating movement thereby along a substantially convex arcuate path from the rest position substantially juxtaposed with a midpoint of the convex arcuate path to one of a first position in contact with the forward switch assembly and a second position in contact with the rearward switch assembly.

5. The signaling system according to claim 1, wherein the forward switch assembly comprises one or more forward contact switches; and the rearward switch assembly comprises one or more rearward contact switches,
    wherein the forward switch assembly is transiently activated when one of the displaceable member and the guide member is in contact with at least one of the forward contact switches, and wherein the rearward switch assembly is transiently activated when one of the displaceable member and the guide member is in contact with at least one of the rearward contact switches.

6. The signaling system according to claim 1, wherein the threshold minimum change in vehicle speed is between 2 mph and 10 mph and occurs over a pre-selected time period of between 0.5 and 10 seconds.

7. The signaling system according to claim 1, wherein the housing further comprises a gimbal member.

8. The signaling system according to claim 1, wherein each of the indicator signal and the acceleration signal are positioned on the housing and wherein the housing is positioned in the vehicle in the location selected to be visible to the operator of another vehicle.

9. A signaling system according to claim 1, wherein the brake lamp further comprises a third filament operable as the acceleration signal, wherein activation of the acceleration signal by the signal controller effects the change in the signal intensity of the acceleration signal to produce the speeding up signal with a predetermined brightness less than the brightness of both the indicator signal and the braking signal.

10. A signaling system for use in a vehicle to provide a signal indicative of a change in vehicle speed, the signaling system comprising:
   a housing;
   a displaceable member moveable relative to the housing from a first rest position to a forward displaced position in response to forward movement of the vehicle caused by a threshold minimum change in vehicle speed;
   a guide member for resiliently positioning said displaceable member to said rest position;
   a forward switch assembly positioned relative to said housing so as to be transiently activated when said displaceable member is in the forward displaced position; and
   an indicator signal positioned in a location selected to be visible to an operator of another vehicle, the indicator signal electrically coupled to the forward switch assembly, wherein activation of the forward switch assembly activates the indicator signal to provide a visual signal indicative of a vehicle slowing, wherein the indicator signal is positionable on the vehicle in a location selected from at least one of a rear windshield of the vehicle, a front windshield of the vehicle, adjacent a headlamp and adjacent a brake lamp, and
   further comprising a signal controller actuable by the forward switch assembly, the signal controller operable to effect a signal feature of the indicator signal selected from the group consisting of signal illumination, signal intensity, signal frequency and signal extinguishment, wherein upon activation by the forward switch assembly, the signal controller is operable to effect a change in the signal intensity of the indicator signal to produce a slowing signal with a predetermined brightness; and
   wherein the brake lamp comprises a first filament operable as a braking signal and a second filament operable as the indicator signal, wherein activation of the indicator signal by the signal controller effects the change in the signal intensity of the indicator signal to produce the slowing signal with a predetermined brightness less than a brightness of the braking signal.

11. The signaling system according to claim 10, wherein the guide member comprises at least one of:
   (a) an elongated U-shaped member with a forward end spaced toward a position adjacent the forward switch assembly and a rearward end spaced toward a position adjacent a rearward wall of the housing, wherein the displaceable member is positioned on the U-shaped member for movement relative thereto from the rest position substantially juxtaposed with a bight position of the U-shaped member to the forward end in contact with the forward switch assembly;
   (b) a swinging member selected from one of an inflexible connector and a flexible connector, wherein the displaceable member is suspended from a lower end portion of the swinging member for pendulate movement thereby along a substantially concave arcuate path from the rest position substantially juxtaposed with a midpoint of the concave arcuate path to a forward position in contact with the forward switch assembly and a rearward position spaced toward a rearward wall of the housing; and
   (c) a vertically upright inflexible member connected to a spring member, wherein the displaceable member is supported at an upper end portion of the vertically upright member for vacillating movement thereby along a substantially convex arcuate path from the rest position substantially juxtaposed with a midpoint of the convex arcuate path to the forward position in contact with the forward switch assembly and the rearward position spaced toward a rearward wall of the housing.

12. The signaling system according to claim 10, wherein the forward switch assembly comprises one or more forward contact switches, and wherein the forward switch assembly is transiently activated when one of the displaceable member and the guide member is in contact with at least one of the forward contact switches.

13. The signaling system according to claim 10, wherein the threshold minimum change in vehicle speed is between 2 mph and 10 mph, over a maximum time period selected at between about 1.5 and 10 seconds.

14. The signaling system according to claim 10, wherein the indicator signal is positioned on the housing, said housing being positionable in the vehicle in the location selected to be visible to the operator of another vehicle.

15. A signaling device for use in a vehicle to provide a signal indicative of a change in vehicle speed, the device comprising:
   a housing;
   a displaceable member moveable relative to the housing from a first rest position to each of a forward displaced position and a rearward displaced position, wherein the displaceable member is displaced from the first rest position to one of the forward displaced position and the rearward displaced position in response to movement of the vehicle caused by a threshold minimum change in vehicle speed;
   a guide member for resiliently positioning said displaceable member to said rest position;
   a forward switch assembly positioned relative to said housing so as to be transiently activated when said displaceable member is in the forward displaced position;
   a rearward switch assembly positioned relative to said housing so as to be transiently activated when said displaceable member is in the rearward displaced position;
   the indicator signal electrically coupled to the forward switch assembly, wherein activation of the forward switch assembly activates the indicator signal to provide a visual signal indicative of a vehicle slowing; and
   an acceleration signal positioned in a location selected to be visible to the operator of another vehicle, the acceleration signal electrically coupled to the rearward switch assembly, wherein activation of the rearward switch assembly activates the acceleration signal to provide a visual speeding-up signal, wherein the indicator signal is positionable on the vehicle in a location selected from at least one of a rear windshield of the vehicle, a front windshield of the vehicle, adjacent a headlamp and adjacent a brake lamp, and
   further comprising a signal controller actuable by the forward switch assembly, the signal controller operable to effect a signal feature of the indicator signal selected from the group consisting of signal illumination, signal intensity, signal frequency and signal extinguishment, wherein upon activation by the forward switch assembly, the signal controller is operable to effect a change in the signal intensity of the indicator signal to produce a slowing signal with a predetermined brightness; and wherein the brake lamp comprises a first filament operable as a braking signal and a second filament operable as the indicator signal, wherein activation of the indicator signal by the signal controller effects the change in the signal intensity of the indicator signal to produce the slowing signal with a predetermined brightness less than a brightness of the braking signal.

16. The device according to claim 15, wherein the guide member comprises at least one of:

(a) an elongated U-shaped member with a forward end spaced toward a position adjacent the forward switch assembly and a rearward end spaced toward a position adjacent the rearward switch assembly, wherein the displaceable member is positioned on the U-shaped member for movement relative thereto from the rest position substantially juxtaposed with a bight position of the U-shaped member to one of the forward end in contact with the forward switch assembly or the rearward end in contact with the rearward switch assembly;

(b) a swinging member selected from one of an inflexible arm and a flexible connector, wherein the displaceable member is suspended from a lower end portion of the swinging member for pendulate movement thereby along a substantially concave arcuate path from the rest position substantially juxtaposed with a midpoint of the concave arcuate path to one of a forward position in contact with the forward switch assembly and a rearward position in contact with the rearward switch assembly; and (c) a vertically upright inflexible member connected to a spring member, wherein the displaceable member is supported at an upper end portion of the vertically upright member for vacillating movement thereby along a substantially convex arcuate path from the rest position substantially juxtaposed with a midpoint of the convex arcuate path to one of the forward position in contact with the forward switch assembly and the rearward position in contact with the rearward switch assembly.

17. The device according to claim 15, wherein the device is an after-market device provided as an integral unit, and wherein the housing further comprises a gimbal member.

* * * * *